(12) United States Patent
Liu et al.

(10) Patent No.: US 7,603,648 B2
(45) Date of Patent: Oct. 13, 2009

(54) MASK DESIGN USING LIBRARY OF CORRECTIONS

(75) Inventors: Peng Liu, Sunnyvale, CA (US); Vivek Singh, Portland, OR (US); Bin Hu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 11/174,336

(22) Filed: Jun. 29, 2005

(65) Prior Publication Data
US 2005/0244728 A1 Nov. 3, 2005

Related U.S. Application Data

(63) Continuation-in-part of application No. 10/789,703, filed on Feb. 27, 2004, now Pat. No. 7,294,437.

(51) Int. Cl.
*G06F 17/50* (2006.01)
(52) U.S. Cl. .............................. 716/21; 716/19; 716/20; 430/5; 430/30; 430/394
(58) Field of Classification Search ............. 716/19–21; 430/5, 30, 394
See application file for complete search history.

(56) References Cited

U.S. PATENT DOCUMENTS 6,794,096 B2   9/2004   Kroyan

2003/0074646 A1   4/2003   Kotani et al.
2004/0073884 A1*  4/2004   Kroyan ........................ 716/19

OTHER PUBLICATIONS

"Domain decomposition methods for simulation of printing and inspection of phase defects"; Michael Lam et al.; Department of Electrical Engineering and Computer Sciences, University of CA-Berkeley, Berkeley, CA 94720; mlLam@eecs.berkeley.edu.
"Boundary Layer Model to Account for Thick Mask Effects in PhotoLithography"; Jaione Tirapu-Azpiroz et al.; Electrical Engineering Dept., UCLA, Los Angeles, CA 90095-1594; jaione@ee.ucla.edu.edu.
"Simplified Models for Edge Transitions in Rigorous Mask Modeling"; Konstantinos Adam et al.; EECS Dept., University of CA at Berkeley, Berkeley, CA 94720; kadam@eecs.berkeley.edu.
Fast rigorous three-dimensional mask diffraction simulation using Battle-Lemarie wavelet-based multiresolution time-domain method, M. S. Yeung, Boston Univ. [5040-07] SPIE 2003, vol. 5040, p. 69.
Fast topography simulation using differential method, S. Y. Zinn, S. Kim, S. Choi, J. Sohn, Samsung Electronics Co., Ltd. (South Korea) [5040-09] SPIE 2003, vol. 5040, p. 92.

(Continued)

*Primary Examiner*—Vuthe Siek
(74) *Attorney, Agent, or Firm*—Fish & Richardson P.C.

(57) ABSTRACT

Systems, techniques, and approaches to quickly generate mask patterns, synthesize near-fields, and design masks. In one aspect, a mask may be designed by modeling the transmitted field using a library of corrections and a fast field model.

23 Claims, 8 Drawing Sheets

OTHER PUBLICATIONS

Rigorous 3D simulation of phase defects in alternating phase-shifting masks. Pistor, T.V.; Proceedings of the SPIE—The International Society for Optical Engineering, vol. 4562, 2002. p. 1038-50. Conference Paper.

Enhancements in rigorous simulation of light diffraction from phase-shift masks. Erdmann, A.; Kachwala, N.; Proceedings of the SPIE—The International Society for Optical Engineering, vol. 4691, 2002. p. 1156-67. Conference Paper.

Metropole-3D: an efficient and rigorous 3D photolithography simulator. Strojwas, A.J.; Li, X.; Lucas, K.D.; IEICE Transactions on Electronics, vol. E82-C, No. 6, Jun. 1999. p. 821-9. Journal Paper.

Lithography simulation employing rigorous solutions to Maxwell's equations. Gordon, R.; Mack, C.A.; Proceedings of the SPIE—The International Society for Optical Engineering, vol. 3334, 1998. p. 176-96. Conference Paper.

\* cited by examiner

MASK DESIGN USING LIBRARY OF CORRECTIONS

This application is a continuation-in-part of and claims priority to U.S. application Ser. No. 10/789,703, filed Feb. 27, 2004 now U.S. Pat. No. 7,294,437.

BACKGROUND

Electronic devices, such as processors, may be formed by patterning successive layers on a substrate using lithography. The patterns are formed using an imaging plate such as a mask or reticle that is designed to produce the desired features on the substrate. As device feature sizes decrease, more complex mask designs are used.

For example, masks incorporating phase shift technology (referred to as phase shift masks) may be used to pattern small features. In a non-phase shift mask, the light transmitted through adjacent features is in phase, so that between adjacent features the amplitude of the light adds together. In a phase shift mask, light transmitted through adjacent features may be phase shifted so that between the features the amplitude of the light from one feature is about equal to but opposite in sign to the amplitude of the light from the other feature. This destructive interference may allow greater control over the creation of small features.

Mask design may be performed using software. For complex mask designs (e.g., design of phase shift masks for sub-wavelength features), accurate mask design software may be undesirably slow. In contrast, faster mask design software may not be suitably accurate.

A number of different methods may be used by the software to design masks. For example, a method referred to as a thin mask method uses geometrical optics to calculate the transmitted field, ignoring light scattering effects due to mask features. A boundary layer method modifies the thin mask field in feature edge areas (the so-called boundary layer) to account for some scattering effects. The edge domain decomposition method adds edge scattering corrections to the thin mask field to improve the accuracy.

DESCRIPTION OF DRAWINGS

Like reference symbols in the various drawings indicate like elements.

DETAILED DESCRIPTION

Systems and techniques described herein may allow for relatively accurate and fast mask design.

The first stage in mask design may involve identifying the desired features to be etched onto a substrate. The mask designer then creates a mask that he thinks will produce these desired features. To model the features that would result from applying the mask, the designer models the pattern of the electromagnetic (EM) field transmitted through the mask. Based on a comparison of the modeled features to the desired features, the designer may change his mask and repeat this process.

A key part of this process is the modeling of the transmitted EM field. A more accurate model of the EM field leads to a mask that more accurately produces the desired features.

Many rigorous methods exist to accurately determine the transmitted EM field. For example, in the Finite Difference Time Domain method, the Maxwell equations are replaced by a set of finite difference equations obtained by discretizing the Maxwell equations in space and time. They are essentially relationships between current states and the states of the next time step. The problem is then solved by marching the solutions in time.

Another rigorous method, the Waveguide method, is a frequency domain method in which the simulation area is divided into 2D or 3D rectangular blocks. The material is considered uniform throughout each block so that the Maxwell equations can be solved analytically for each block. Solutions of all blocks are related by boundary conditions, which result in a set of linear algebraic questions that are then solved using matrix methods.

However, the computation time associated with applying these or other rigorous methods to model transmitted EM field is prohibitive. Because of this difficulty, many mask designers employ a so-called "fast method." For example, in the geometric optics method, the amplitude of the transmitted EM field in portions where the mask is chrome (or other light-blocking material) is considered to be zero. Where the mask is glass (or other light-passing material), the field is considered to be equivalent to the EM source. Although this method is simply and quickly calculated, it ignores some of the physics of EM field transmission, such as diffusion around edges and interferences that may be caused by nearby features.

Figure 1:
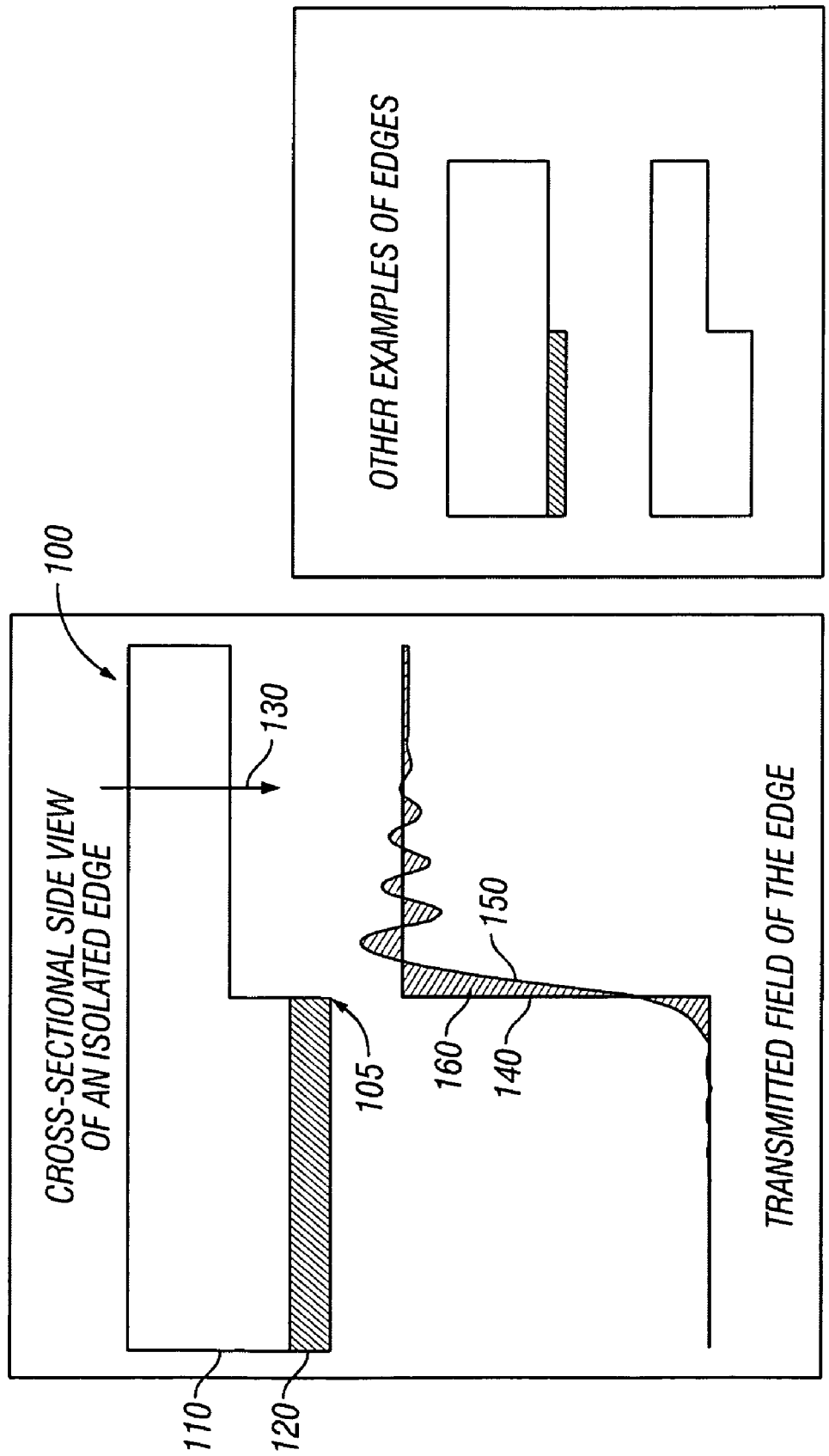
FIG. 1 is a cross-sectional side view of an isolated edge in a mask and a plot of the transmitted field.

FIG. 1 illustrates this concept. The mask 100 is of an isolated edge 105 that has a glass portion 110 and a light-blocking chrome portion 120. In the figure, light is transmitted through the mask in the direction shown by the arrow 130. Plot 140 shows the geometric optics model of the near-field, and plot 150 illustrates a calculation of the near-field using a rigorous method. A comparison of the two plots demonstrates that there is a certain amount of error associated with using a fast method to determine the near-field. This error is indicated by the shaded portions 160. (Note that all the plots in the attached figures indicate amplitude only, not phase.)

Because fast methods only approximate the transmitted EM field, they may result in masks that do not accurately create the desired features. A rigorous model alternative, however, may allow accurate masks but the model may be too computationally intensive for practical use. The present approach offers a both fast and accurate way to model the transmitted EM field and thereby to design an accurate mask.

Figure 2:
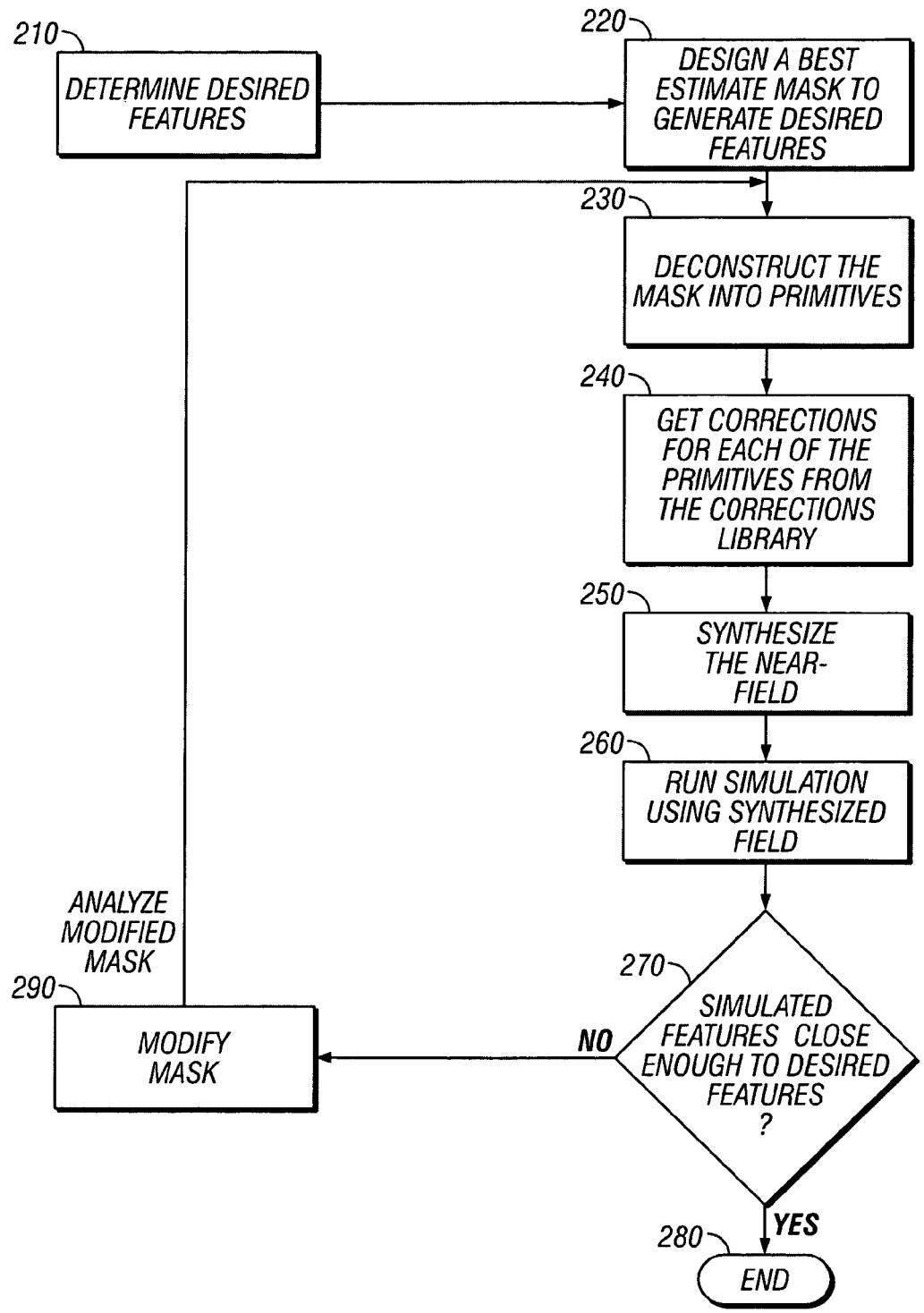
FIG. 2 is a flowchart illustrating a method to design a mask to quickly and accurately generate desired features onto a substrate.

The flowchart in FIG. 2 illustrates a method to design a mask to quickly and accurately generate desired features onto a substrate. In block 210, the desired features are identified. Based on these features, a best estimate mask is designed in block 220. A mask may consist of a combination of edges, corners, spaces, and other shapes; these shapes may be referred to as primitives. In block 230, the mask is deconstructed into its primitives. The corrections corresponding to the primitives are retrieved from the corrections library in block 240. These corrections are used in block 250 to synthesize the near-field. This will be discussed in more detail below. In block 260, a simulation is conducted using the synthesized field to determine the features that would be generated by using the mask. The simulated features are compared to the desired features in block 270 to determine whether the simulated features are sufficiently similar to the desired features that the mask should be used without further modification. If so, the process ends in block 280. If not, the mask is modified in block 290 to try to generate features that are closer to the desired features. The process then loops back to block 230 to analyze the modified mask.

Figure 3:
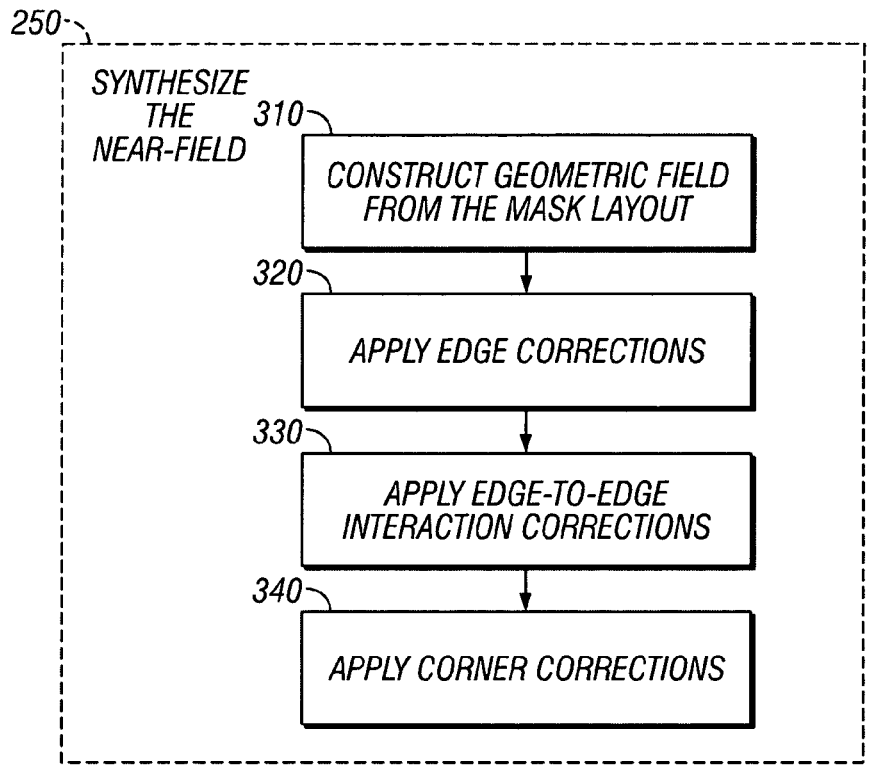
FIG. 3 illustrates one way to synthesize the near-field.

FIG. 3 illustrates one way to accomplish the synthesis of block 250. First, the mask layout is used to construct a geometric field in block 310. The edge corrections from the corrections library are added to this geometric field in block 320. Edge-to-edge corrections from the library are then added in block 330 and corner corrections are added in block 340. The resulting synthesized field corresponds to the field that would result from using a rigorous method. These corrections are discussed in more detail below in connection with the creation of the library.

Figure 4:
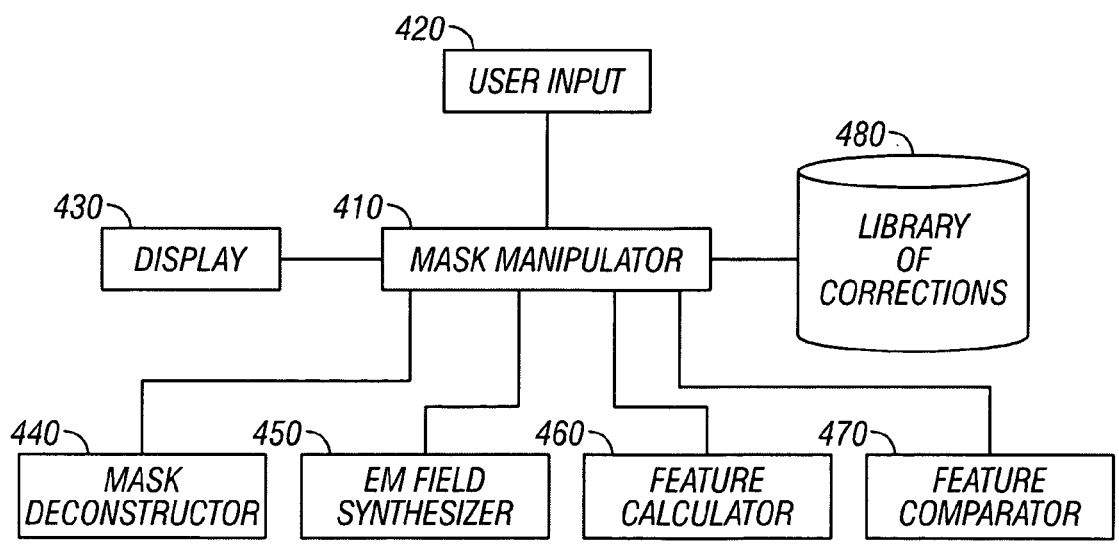
FIG. 4 is an embodiment of a system for creating a mask.

FIG. 4 shows a system for creating a mask according to an embodiment. A mask manipulator module 410 is coupled to a user input module 420, a display module 430, a mask deconstructor 440, an EM field synthesizer 450, a feature calculator 460, a feature comparator 470, and a library of corrections for primitives 480.

An initial mask is input into the mask manipulator 410 and the mask deconstructor 440 deconstructs the mask into its primitives (e.g., edges, edge-to-edge interactions, corners, etc.). The EM field synthesizer 450 looks up the correction for each primitive in the library of corrections 480 and then applies these corrections to an appropriate fast method. The resulting synthesized field corresponds to the field that would be calculated using a rigorous method. This is discussed in more detail below in connection with the creation of the library.

The feature calculator 460 uses the synthesized field to determine the features that would result from the application of the mask. The feature comparator 470 then compares these features with the desired features. The mask manipulator 410 changes the mask to reduce the discrepancy between the desired features and the synthesized features, and the resulting new mask is analyzed in the same way as described above.

The display 430 may show the synthesized field as well as the results of the comparison done by the feature comparator 470. If any user input is required, it may be given using the user input module 420.

Various tasks may be performed manually or automatically. For example, the feature comparator 470 may perform its comparison automatically or with input from the user. A user may deconstruct a mask manually instead of allowing the mask deconstructor 440 to do so automatically. Similarly, the mask manipulator 410 may make changes to a mask completely automatically or with some user interaction. (These are merely non-exhaustive examples of tasks that may be performed with varying degrees of automation.)

If there is no correction for a particular primitive on the mask in the library, the correction for that primitive may be interpolated from similar primitives. For example, suppose a mask has a space that is 25 nm wide, but the closest corrections in the library are for spaces 20 nm and 30 nm wide. The correction for a 25 nm space may then be estimated as, for example, a linear interpolation between the 20 nm correction and the 30 nm correction. If the library contains primitives of sufficient number and variety, then interpolation may not introduce significant error.

One important advantage of designing a mask as described above is that very small channels may be created. This results from the mask designer's ability to now quickly and accurately model the interaction between two edges that may be close together. Accordingly, in one embodiment, channels may be designed and implemented that are of a width equal to or less than the wavelength of the light being used.

In an embodiment, a simulated printed pattern generated for a mask design may be used to inspect a mask including the mask design. Masks may also be generated using lithography techniques, and may acquire defects during the manufacturing process or from contamination. The mask may be inspected by comparing an actual printed pattern generated using the mask to the simulated printed pattern generated for the mask design. Any deviations between the simulated and actual printed patterns may indicate a defect on the mask.

Creating a Library of Corrections

The library of corrections comprises entries that reflect the error associated with using a fast model instead of a rigorous method to determine the transmitted EM field. For example, the shaded portions 160 in FIG. 1 indicate the error associated with using a geometric model instead of a rigorous method to calculate the transmitted field for an isolated edge. This error may be calculated by subtracting the geometric model from the rigorous calculation. This quantity is called the "edge correction" because the addition of the quantity to the geometric model "corrects" it to conform to the rigorous model.

Figure 5:
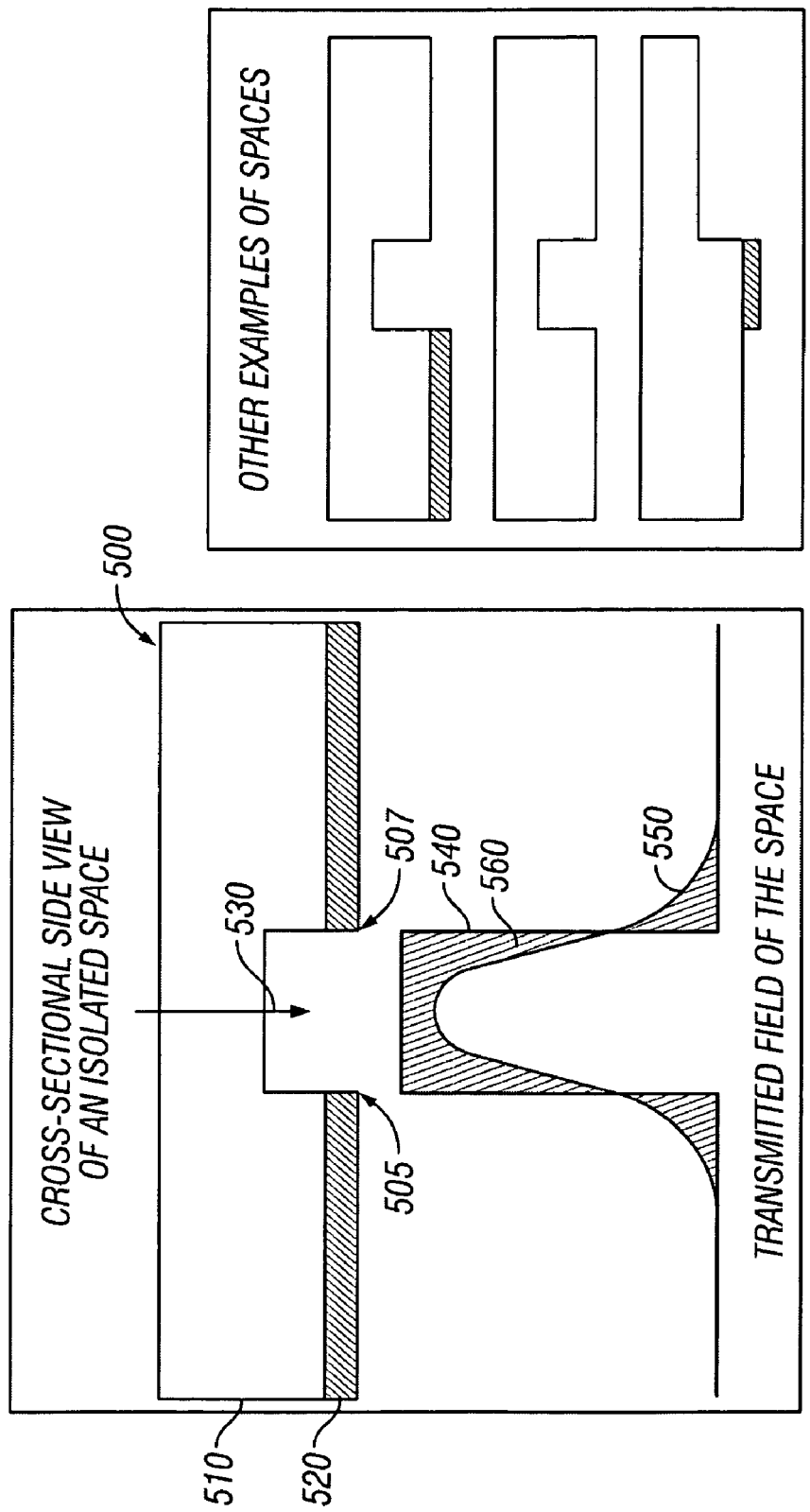
FIG. 5 is a cross-sectional side view of an isolated space in a mask and a plot of the transmitted field.

Similarly, an edge-to-edge interaction correction can be calculated. FIG. 5 represents an isolated pair of edges 505 and 507 in a mask 500. The mask has a light-transmitting portion 510 and a light-blocking portion 520. Light is directed into the mask in the direction shown by arrow 530. Plot 540 illustrates the geometric model of the amplitude of the transmitted field, and plot 550 represents the transmitted field calculated using a rigorous method. The shaded portion 560 represents the error associated with using the geometric model rather than a rigorous method. To calculate an edge-to-edge interaction correction, the geometric field and the edge corrections are subtracted from the rigorous field. The edge corrections are subtracted to isolate the error associated with the interaction of the edges. Reconstruction of the rigorous field then involves adding both the edge corrections and the edge-to-edge interaction corrections to the geometric field.

Alternatively, a space correction may be calculated. In one embodiment, this involves subtracting only the geometric field from the rigorous field. The resulting space correction is represented by the shaded region 560. Reconstructing the rigorous field would then involve adding only the space correction to the geometric field; no other edge corrections would be required (for this isolated space). Such a space correction may be used in place of separate edge corrections and edge-to-edge interaction corrections. In another embodiment, space corrections may be calculated as the sum of: (a) the average of the edge corrections on each side of the space, and (b) the edge-to-edge interaction correction between the two edges. The space correction for the space located beyond the edge at the end of a mask may be calculated as one-half the edge correction for that edge.

To extend this further, a corner correction may be calculated by subtracting the geometric field and the edge corrections of an isolated corner from the rigorous field of the isolated corner.

There are numerous shapes for which corrections may be calculated. For example, a particular square shape may be a shape for which it may be useful to have a correction present in the library. A correction may be calculated that allows a quick and accurate synthesis of the rigorous field.

Corrections more advanced than edge corrections, such as space corrections, corner corrections, and shape corrections, may account for scattering effects and interactions between mask features, which may be important for sub-wavelength features.

Figure 6:
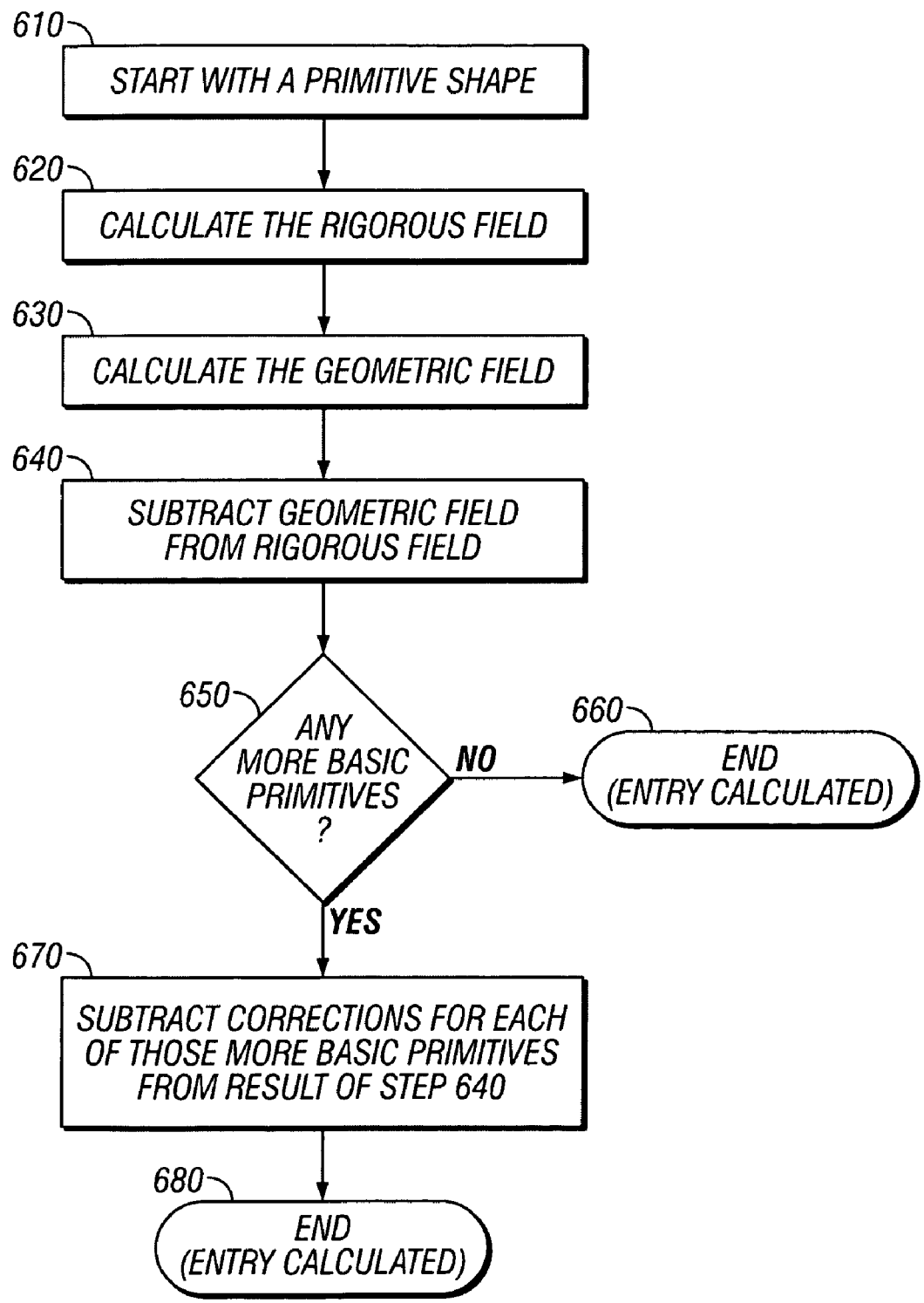
FIG. 6 is a flowchart for calculating an entry in the library of corrections.

FIG. 6 shows a flowchart for calculating an entry in the library of corrections. Block 610 starts with a primitive shape, e.g., an isolated edge. The rigorous geometric fields are calculated in blocks 620 and 630, respectively. In block 640, the geometric field is subtracted from the rigorous field. Block 650 involves checking whether there are any more basic primitives than the primitive shape under consideration. For example, the edges surrounding a space are more basic primitives than the space itself. If there are such more basic primitives, the corrections for those primitives are subtracted in block 670 from the result of block 640; the result of block 670 is then entered into the library in block 680 as the correction for the primitive shape under consideration. If there were not any more basic primitives in block 650, the result of block 640 is entered into the library in block 660.

The correction for each primitive may vary depending on many different parameters. Thus, each correction may be calculated for several different values of the various parameters. These parameters may be formulated into an index to aid in retrieving entries from the library. For example, corrections may be dependent on one or more of the following: illumination wavelength; glass material refractive index and extinction coefficient; absorber material refractive index; extinction coefficient; stack thickness; and glass phase trench side wall profile and undercut. In addition, an edge library may be dependent on additional parameters, such as light polarization; phase/chrome on the left side of the edge; and phase/chrome on the right side of the edge. Similarly, an edge-to-edge interaction library may have additional dependencies on: light polarization; width between the two edges; phase/chrome on the left; phase/chrome in the middle; and phase/chrome on the right. This idea may be extended for libraries for other shapes, such as corners, which may be dependent on one or more of the following: light polarization; lower left phase/chrome; upper left phase/chrome; lower right phase/chrome; and upper right phase/chrome.

Additional observations may allow some libraries to be created by manipulating other libraries. For example, a particular primitive may be the mirror image of a second primitive for which a library already exists. In that case, a library for the first primitive may be generated as a mirror image of the library for the second primitive. Similarly, a primitive may be a 90-degree clockwise geometric rotation of another primitive; an entirely new library may be created simply by rotating clockwise an existing library. Thus, performing some operations, such as the geometric operations of mirror image, rotation, etc., may allow libraries of corrections to be generated without the need to fully calculate each library from scratch. This may reduce the time required to generate the libraries.

By calculating a library of corrections, the long computation time associated with using rigorous methods may be performed before the mask-design process has even begun. The rigorous field (synthesized by adding the appropriate corrections to a fast method) may then be used during the design process without the delay involved with calculating the rigorous field itself. Moreover, the one-time investment in computation time to create the library of corrections may allow for the unlimited use of those corrections to synthesize the rigorous field in the design of future masks. Thus, once a rigorous method is used to construct the library, calculating the transmitted EM field is simply a matter of choosing the correct corrections from the library and applying these corrections to a fast method. The fast method used in synthesizing the field using the corrections may be the same fast method that was used in creating the corrections.

Figure 7:
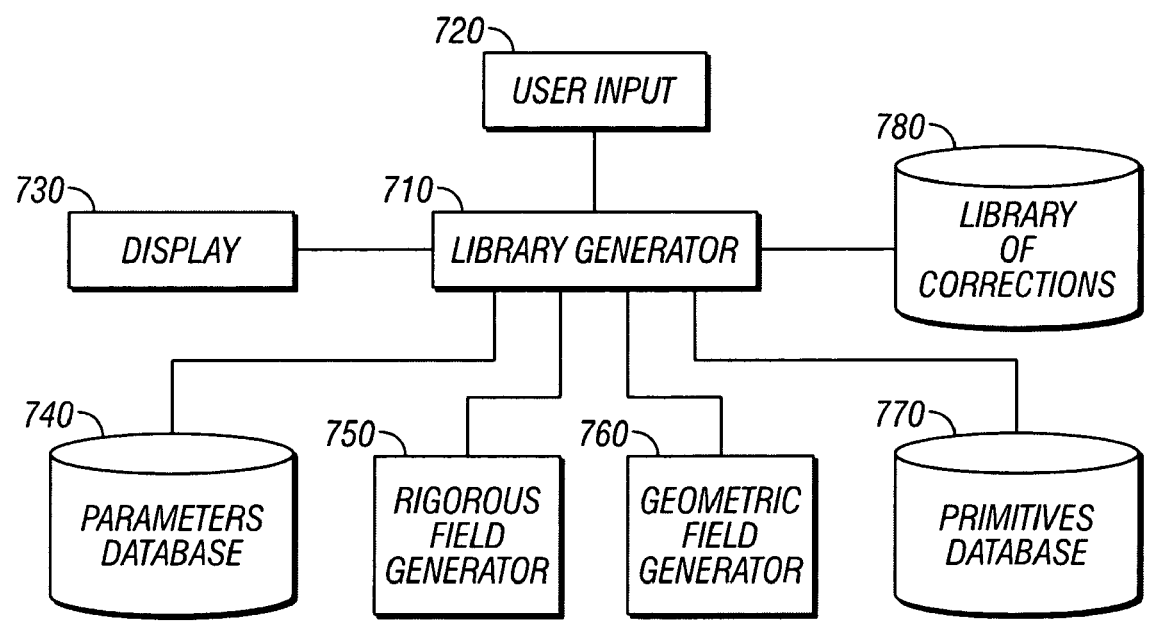
FIG. 7 is an embodiment of a system to generate a library of corrections.

FIG. 7 shows an embodiment of a system to generate a library of corrections. A library generator module 710 is coupled to a user input module 720, a display module 730, a parameters database 740, a rigorous field generator 750, a fast field generator 760, a primitives database 770, and a library of corrections for primitives 780.

The library generator 710 selects a primitive from the primitives database 770 and a set of parameters from the parameters database 740. These are used by the rigorous field generator 750 to generate a model of the transmitted field using a rigorous method. Likewise, the fast field generator 760 may use the same quantities to generate a model for the transmitted field using a fast method, such as the geometric optics method. The library generator 710 then subtracts the fast field from the rigorous field. Additionally, if there are any corrections for more basic primitives in the library 780, the library generator also subtracts those corrections from the rigorous field. The resulting correction is stored as an entry in the library 780. This entry may be indexed according to the values that were used from the parameters database 740 and the primitives database 770.

In some implementations, the pattern in the mask includes pixels. Each pixel may represent light-blocking or light-passing areas of the mask. A pixel may also represent a phase-shifting area of the mask. Each of these pixels may be treated as primitives, or several pixels may be treated together as a single primitive. For example, a vertical line of light-passing pixels may represent a channel or a space in the mask. In such masks, mask design may be accomplished by changing the characteristics of one or more pixels in the mask and then re-analyzing the mask.

A method may include receiving a first primitive shape, determining a rigorous field corresponding to the first primitive shape, determining a geometric field corresponding to the first primitive shape, and calculating a first correction by subtracting the geometric field from the rigorous field. A method may also include checking whether a second primitive shape is more basic than the first primitive shape, if the second primitive shape is more basic than the first primitive shape, calculating a library entry for the first primitive shape by subtracting a second correction for the second primitive shape from the first correction, and if the second primitive shape is not more basic than the first primitive shape, entering the first correction as a library entry for the first primitive shape.

A method for synthesizing a near-field may include constructing a geometric field from a mask layout, applying an edge correction, applying an edge-to-edge interaction correction, and applying a corner correction.

A method may include selecting a primitive from a primitives database, selecting a set of parameters from a parameters database, using the primitive and the set of parameters to generate a rigorous model of a transmitted field using a rigorous method, using the primitive and the set of parameters to generate a fast model for the transmitted field using a fast method, generating a correction, comprising subtracting the fast model from the rigorous model, and storing the correction in a library.

An apparatus may include a primitives database, a parameters database, a rigorous field generator for generating a rigorous field model of a transmitted field using a rigorous method, a fast field generator for generating a fast field model for the transmitted field using a fast method, and a library generator for generating a correction by subtracting from the rigorous field model the fast field model and further subtracting all corrections for any more basic primitives in a library.

A method may include: (a) receiving a first mask pattern, with at least a portion of the first mask pattern having a first mask feature; (b) synthesizing a first near-field corresponding to the at least a portion of the first mask pattern using a library of corrections; (c) generating a second mask pattern by modifying the first mask pattern, with the modifying the first mask pattern including modifying the first mask feature; (d) determining a first effect on the first near-field corresponding to the modifying the first mask feature; (e) synthesizing a second near-field corresponding to at least a portion of the second mask pattern by applying the first effect to the first near-field; (f) using the second near-field to determine a second wafer pattern corresponding to the at least a portion of the second mask pattern; and (g) comparing the second wafer pattern to a desired wafer pattern.

A mask may be designed by (a) receiving a first mask pattern, with at least a portion of the first mask pattern having a first mask feature; (b) synthesizing a first near-field corresponding to the at least a portion of the first mask pattern using a library of corrections; (c) generating a second mask pattern by modifying the first mask pattern, with the modifying the first mask pattern including modifying the first mask feature; (d) determining a first effect on the first near-field corresponding to the modifying the first mask feature; (e) synthesizing a second near-field corresponding to at least a portion of the second mask pattern by applying the first effect to the first near-field; (f) using the second near-field to determine a second wafer pattern corresponding to the at least a portion of the second mask pattern; and (g) comparing the second wafer pattern to a desired wafer pattern.

A processor may be designed using a mask that may have been designed by: (a) receiving a first mask pattern, with at least a portion of the first mask pattern having a first mask feature; (b) synthesizing a first near-field corresponding to the at least a portion of the first mask pattern using a library of corrections; (c) generating a second mask pattern by modifying the first mask pattern, with the modifying the first mask pattern including modifying the first mask feature; (d) determining a first effect on the first near-field corresponding to the modifying the first mask feature; (e) synthesizing a second near-field corresponding to at least a portion of the second mask pattern by applying the first effect to the first near-field; (f) using the second near-field to determine a second wafer pattern corresponding to the at least a portion of the second mask pattern; and (g) comparing the second wafer pattern to a desired wafer pattern.

An article may include a machine-readable medium that includes machine-executable instructions that are operative to cause one or more machines to perform operations such as those described above and elsewhere herein. Thus, an article may include a machine-readable medium that includes machine-executable instructions that are operative to cause one or more machines to: (a) receive a first mask pattern, at least a portion of the first mask pattern having a first mask feature; (b) synthesize a first near-field corresponding to the at least a portion of the first mask pattern using a library of corrections; (c) generate a second mask pattern by modifying the first mask pattern, the modifying the first mask pattern comprising modifying the first mask feature; (d) determine a first effect on the first near-field corresponding to the modifying the first mask feature; (e) synthesize a second near-field corresponding to at least a portion of the second mask pattern by applying the first effect to the first near-field; (f) use the second near-field to determine a second wafer pattern corresponding to the at least a portion of the second mask pattern; and (g) compare the second wafer pattern to a desired wafer pattern.

An apparatus may include a mask manipulator configured to change one or more elements of a mask pattern and an electromagnetic field synthesizer that is configured to identify the changed elements of the mask pattern, calculate the effects on a first near-field of the changed elements, and apply the effects to the first near-field to generate a second near-field.

Figure 8:
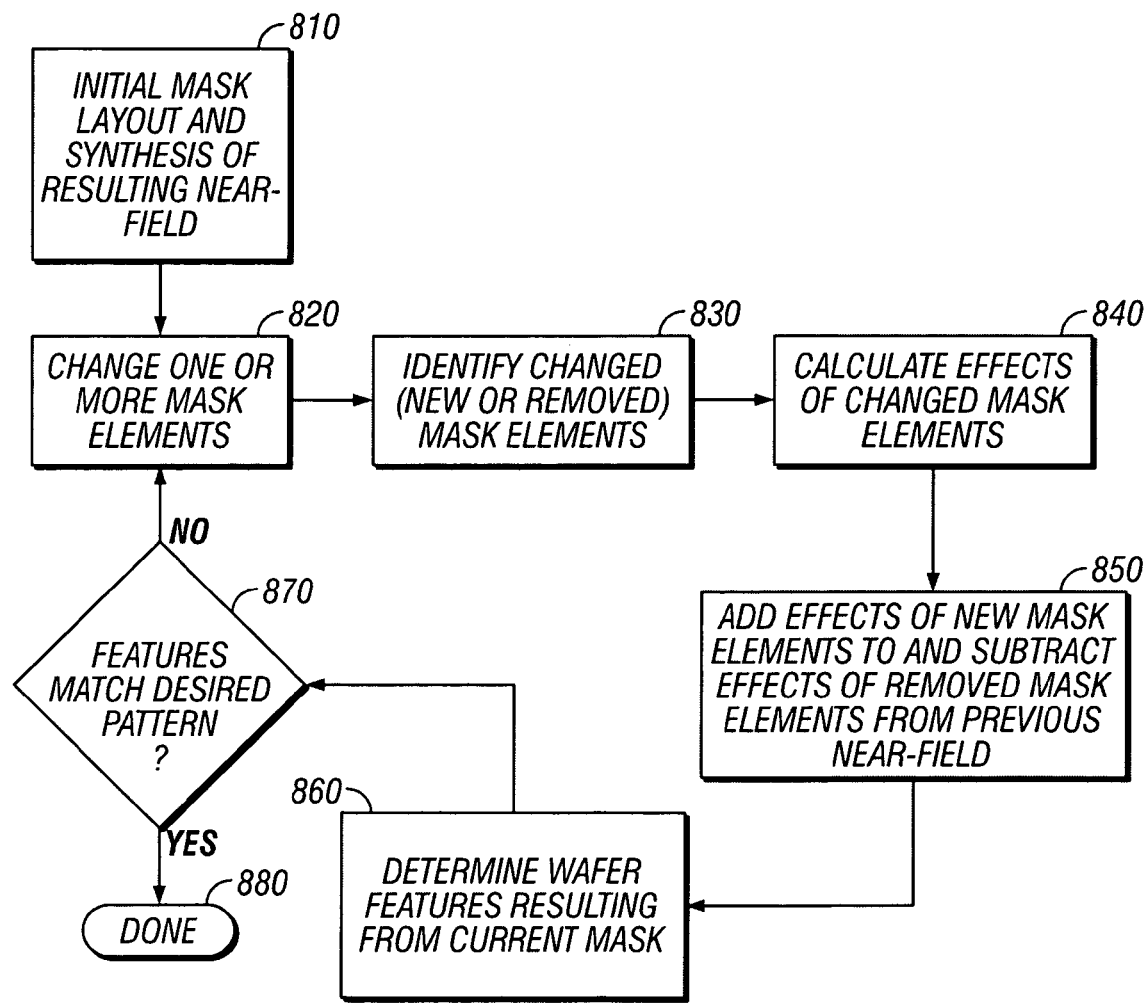
FIG. 8 is a flowchart illustrating a way to quickly calculate a mask.

FIG. 8 illustrates a quick mask design process. At block 810, an initial mask layout is created and the resulting near-field is synthesized. At block 820, one or more elements of the mask may be changed. This may involve changing one or more pixels of the mask. Any changes made in block 820 may be analyzed at block 830 to identify which elements of the mask were added or removed. Elements that were modified but not completely deleted may be considered to have been removed and replaced with a new element with modified characteristics.

At block 840, the effects of these mask elements on the near-field is calculated. This may be done using a library of primitives. At block 850, a new near-field may be synthesized by adding to the previously-synthesized near-field the effects of the new mask elements and by subtracting from the previously-synthesized near-field the effects of the removed mask elements.

The newly-synthesized near-field is used to run a simulation at block 860 to determine the wafer features that would be generated by using the mask. At block 870, the simulated features are compared to the desired wafer pattern to determine whether the simulated features are sufficiently similar to the desired pattern that the mask should be used without further modification. If so, the process ends in block 880. If not, the process loops back to block 820 to modify the mask to try to generate features that are closer to the desired wafer pattern.

Figure 9:
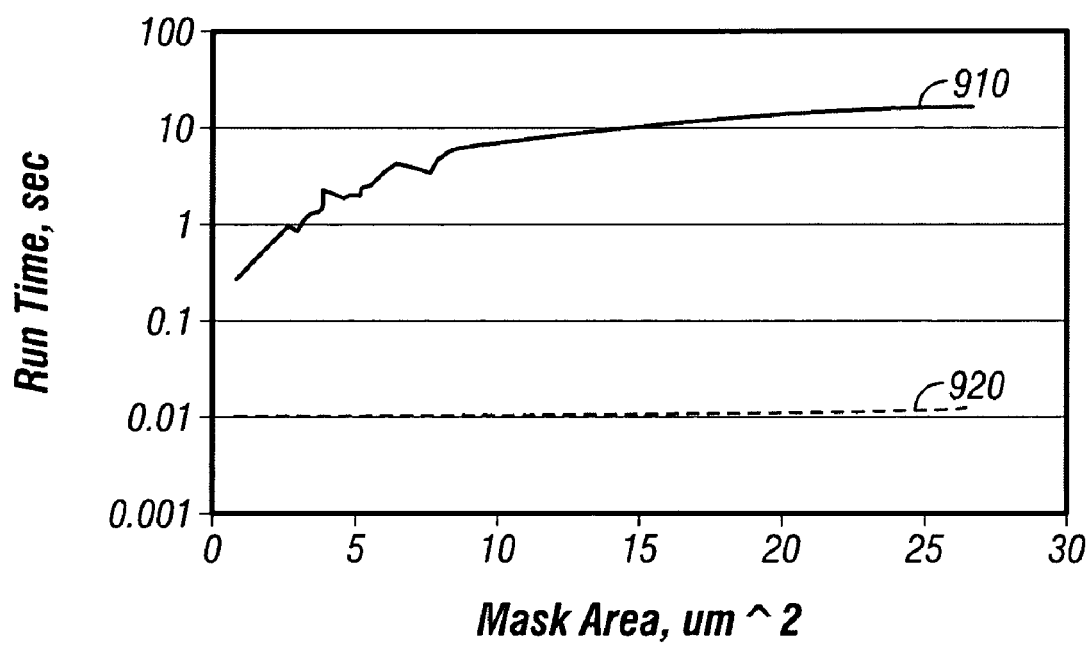
FIG. 9 is a chart comparing computation times for two methods of calculating the near-field during mask design.

FIG. 9 illustrates comparative computation times for synthesis of the near-field for each iteration during iterative mask design as a function of the area of the mask in square microns. Plot 910 corresponds to the computation time in which the near-field for the entire mask is recalculated in each iteration, e.g., as in FIG. 2. Plot 920 corresponds to the computation time in which only the portion of the near-field that was different from the previously synthesized near-field is calculated in each iteration, e.g., as in FIG. 8. As FIG. 9 shows, the computation time associated with plot 910 increases as the mask area increases, whereas the computation time associated with plot 920 remains essentially constant. For masks larger than 15 $\mu m^2$, calculating the near-field for only the modified portions of the mask in each iteration of the mask design loop may provide more than a thousand-fold increase in mask design speed.

The system for designing a mask depicted in FIG. 4 may be used to implement a quick mask design method. For example, the EM field synthesizer 450 may implement the functionality of blocks 830, 840, and 850 of FIG. 8.

A number of implementations have been described. Nevertheless, it will be understood that various modifications may be made without departing from the spirit and scope of the invention. For example, the library is not limited in the types of corrections present; it should be evident that there are many other types of corrections that may be in the library (e.g. space corrections, corner-to-corner interaction corrections, etc.). Also, blocks in a flowchart and various operations described above may be skipped or performed out of order and still provide desirable results. Various tasks may be performed automatically or manually. Accordingly, other implementations are within the scope of the following claims.

What is claimed is:

1. A method comprising:
    receiving a first mask pattern in a mask manipulator module, at least a portion of the first mask pattern having a first mask feature;
    synthesizing, in an electromagnetic field synthesizer, a first near-field corresponding to said at least a portion of the first mask pattern using a library of corrections;
    generating, in the mask manipulator module, a second mask pattern by modifying the first mask pattern, said modifying the first mask pattern comprising modifying the first mask feature;
    determining, in the electromagnetic field synthesizer, a first effect on the first near-field corresponding to said modifying the first mask feature;
    synthesizing, in the electromagnetic field synthesizer, a second near-field corresponding to at least a portion of the second mask pattern by applying the first effect to the first near-field;
    using said second near-field to determine a second wafer pattern corresponding to said at least a portion of the second mask pattern; and
    comparing, in a feature comparator, the second wafer pattern to a desired wafer pattern.

2. The method of claim 1, wherein said modifying the first mask feature comprises removing the first mask feature.

3. The method of claim 2, wherein said applying the first effect comprises subtracting the first effect from the first near-field.

4. The method of claim 1, wherein said modifying the first mask feature comprises replacing the first mask feature in the first mask with a different mask feature.

5. The method of claim 4, wherein said applying the first effect comprises:
    determining a removal effect on the first-near field corresponding to a removal of the first mask feature from the first mask;
    determining an addition effect on the first-near field corresponding to an addition of the different mask feature;
    subtracting the removal effect from the first near-field; and
    adding the addition effect to the first near-field.

6. The method of claim 1, wherein said modifying the first mask pattern comprises adding a new mask feature.

7. The method of claim 6, wherein said applying the first effect comprises adding the first effect to the first near-field.

8. The method of claim 1, wherein said determining the first effect on the first near-field comprises retrieving a first correction from a library of corrections.

9. The method of claim 1, wherein the first mask pattern, the second mask pattern, and the first mask feature each comprise a plurality of pixels.

10. The method of claim 1, wherein the first mask pattern and the second mask pattern each comprise a plurality of pixels, and wherein the first mask feature consists essentially of one pixel.

11. A mask comprising a specific mask pattern, the specific mask pattern having been designed by:
    receiving a first mask pattern, at least a portion of the first mask pattern having a first mask feature;
    synthesizing a first near-field corresponding to said at least a portion of the first mask pattern using a library of corrections;
    generating a second mask pattern by modifying the first mask pattern, said modifying the first mask pattern comprising modifying the first mask feature;
    determining a first effect on the first near-field corresponding to said modifying the first mask feature;
    synthesizing a second near-field corresponding to at least a portion of the second mask pattern by applying the first effect to the first near-field;
    using said second near-field to determine a second wafer pattern corresponding to said at least a portion of the second mask pattern; and
    comparing the second wafer pattern to a desired wafer pattern.

12. The mask of claim 11, wherein:
    (a) said modifying the first mask feature comprises replacing the first mask feature in the first mask with a different mask feature; and
    (b) said applying the first effect comprises:
        (1) determining a removal effect on the first-near field corresponding to a removal of the first mask feature from the first mask;
        (2) determining an addition effect on the first-near field corresponding to an addition of the different mask feature;
        (3) subtracting the removal effect from the first near-field; and
        (4) adding the addition effect to the first near-field.

13. A processor having been designed using the mask of claim 12.

14. A processor having been designed using the mask of claim 11.

15. An article comprising a machine-readable medium including machine-executable instructions, the instructions operative to cause one or more machines to:
    receive a first mask pattern, at least a portion of the first mask pattern having a first mask feature;
    synthesize a first near-field corresponding to said at least a portion of the first mask pattern using a library of corrections;
    generate a second mask pattern by modifying the first mask pattern, said modifying the first mask pattern comprising modifying the first mask feature;
    determine a first effect on the first near-field corresponding to said modifying the first mask feature;
    synthesize a second near-field corresponding to at least a portion of the second mask pattern by applying the first effect to the first near-field;
    use said second near-field to determine a second wafer pattern corresponding to said at least a portion of the second mask pattern; and
    compare the second wafer pattern to a desired wafer pattern.

16. The article of claim 15, wherein said modifying the first mask feature comprises removing the first mask feature.

17. The article of claim 16, wherein said applying the first effect comprises subtracting the first effect from the first near-field.

18. The article of claim 15, wherein said modifying the first mask feature comprises replacing the first mask feature in the first mask with a different mask feature.

19. The article of claim 18, wherein said applying the first effect comprises:
- determining a removal effect on the first-near field corresponding to a removal of the first mask feature from the first mask;
- determining an addition effect on the first-near field corresponding to an addition of the different mask feature;
- subtracting the removal effect from the first near-field; and
- adding the addition effect to the first near-field.

20. The article of claim 15, wherein said modifying the first mask pattern comprises adding a new mask feature.

21. The article of claim 20, wherein said applying the first effect comprises adding the first effect to the first near-field.

22. The article of claim 15, wherein the instructions operative to cause the one or more machines to determine the first effect on the first near-field comprise instructions operative to cause the one or machines to retrieve a first correction from a library of corrections.

23. The article of claim 15, wherein the desired wafer pattern includes a plurality of desired features, said desired features including features smaller than a wavelength of light with which a mask corresponding to the desired wafer pattern is to be illuminated.

* * * * *

UNITED STATES PATENT AND TRADEMARK OFFICE
CERTIFICATE OF CORRECTION

| | | |
|---|---|---|
| PATENT NO. | : 7,603,648 B2 | Page 1 of 1 |
| APPLICATION NO. | : 11/174336 | |
| DATED | : October 13, 2009 | |
| INVENTOR(S) | : Liu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1110 days.

Signed and Sealed this

Fifth Day of October, 2010

David J. Kappos
*Director of the United States Patent and Trademark Office*